United States Patent
Wang et al.

(10) Patent No.: US 9,588,540 B2
(45) Date of Patent: Mar. 7, 2017

(54) SUPPLY-SIDE VOLTAGE REGULATOR

(71) Applicant: FREESCALE SEMICONDUCTOR, INC., Austin, TX (US)

(72) Inventors: Zhengxiang Wang, Suzhou (CN); Jie Jin, Suzhou (CN)

(73) Assignee: FREESCALE SEMICONDUCTOR, INC., Austin, TX (US)

( * ) Notice: Subject to any disclaimer, the term of this patent is extended or adjusted under 35 U.S.C. 154(b) by 68 days.

(21) Appl. No.: 14/850,947

(22) Filed: Sep. 10, 2015

(65) Prior Publication Data

US 2016/0239038 A1 Aug. 18, 2016

(51) Int. Cl.
  *G05F 3/26* (2006.01)
  *G05F 1/618* (2006.01)
  *G05F 1/613* (2006.01)
  *G05F 1/571* (2006.01)
  *H02M 3/07* (2006.01)

(52) U.S. Cl.
  CPC .............. *G05F 3/267* (2013.01); *G05F 1/571* (2013.01); *G05F 1/613* (2013.01); *G05F 1/618* (2013.01); *H02M 3/073* (2013.01)

(58) Field of Classification Search
  CPC .......... G05F 1/575; G05F 3/262; G05F 1/565; G05F 3/267; G05F 1/571; G05F 1/613; G05F 1/618; H03F 2200/297; H03F 2203/45301; H03F 3/34; H03F 3/45183; H03F 2203/45674; H03F 3/45179; H03F 2203/30015; H03F 3/21; H03F 3/3023; H03F 3/345; H02M 2001/0025; H02M 3/073

USPC .................................. 323/273–281, 312–314
See application file for complete search history.

(56) References Cited

U.S. PATENT DOCUMENTS

| | | | |
|---|---|---|---|
| 6,300,749 B1 * | 10/2001 | Castelli | G05F 1/575 |
| | | | 323/273 |
| 6,710,583 B2 | 3/2004 | Stanescu et al. | |
| 7,205,827 B2 * | 4/2007 | Leung | G05F 1/575 |
| | | | 323/280 |
| 7,248,025 B2 * | 7/2007 | Adachi | G05F 1/575 |
| | | | 323/273 |
| 7,880,531 B2 | 2/2011 | Park | |
| 8,305,066 B2 * | 11/2012 | Lin | G05F 1/575 |
| | | | 323/285 |

(Continued)

*Primary Examiner* — Jessica Han
*Assistant Examiner* — Demetries A Gibson
(74) *Attorney, Agent, or Firm* — Charles E. Bergere

(57) ABSTRACT

A voltage regulator generates an output voltage that is a designed voltage level below the supply voltage. A reference voltage generator generates a reference voltage between ground and supply voltages. A voltage divider generates a feedback voltage between the supply and output voltages. An amplifier generates an amplifier output voltage based on a difference between the reference and feedback voltages. A buffer buffers the amplifier output voltage. A pass transistor receives the buffered voltage at its control node to sink an average load current appearing at the output node. A capacitor is connected between the supply and output voltages to provide a peak load current. A load-current-detecting transistor receives the buffered voltage at its control node to sense the load current. A compensation transistor compensates for leakage current. An internal load converts the sensed load current into a voltage control signal applied to the compensation transistor.

11 Claims, 3 Drawing Sheets

(56) References Cited

U.S. PATENT DOCUMENTS

| | | | |
|---|---|---|---|
| 8,810,224 B2* | 8/2014 | Zhang | G05F 1/575 |
| | | | 323/280 |
| 2012/0187930 A1* | 7/2012 | Williams | G05F 1/5735 |
| | | | 323/273 |
| 2013/0113446 A1 | 5/2013 | De Haas | |
| 2013/0307502 A1* | 11/2013 | Bhattacharyya | G05F 1/565 |
| | | | 323/282 |
| 2014/0210430 A1* | 7/2014 | Bhattad | G05F 3/02 |
| | | | 323/233 |
| 2014/0266106 A1* | 9/2014 | El-Nozahi | G05F 1/575 |
| | | | 323/280 |

* cited by examiner

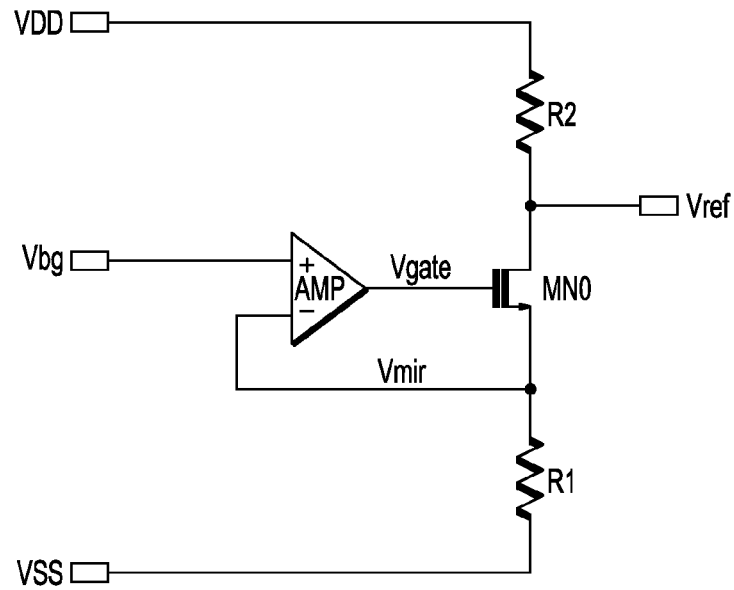
FIG. 2    110
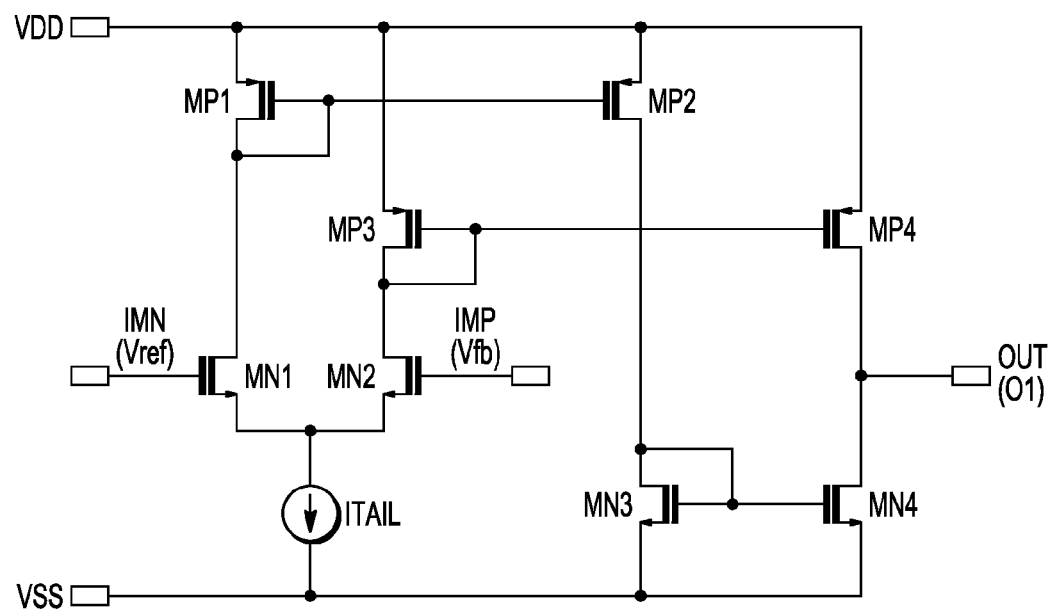
FIG. 3    120

SUPPLY-SIDE VOLTAGE REGULATOR

BACKGROUND

The present invention relates to integrated circuits and, more particularly, to a voltage regulator.

P-channel devices, such as p-type metal oxide semiconductor (PMOS) transistors, are the preferred choice for low-cost, low-complexity controllers such as DC motor controllers and buck-charge stages. There is a need, however, for a stable and accurate voltage regulator to be used as a power supply for a PMOS driver circuit.

BRIEF DESCRIPTION OF THE DRAWINGS

Other embodiments of the invention will become more fully apparent from the following detailed description, the appended claims, and the accompanying drawings in which like reference numerals identify similar or identical elements.

FIG. 2 is a schematic circuit diagram of a reference voltage generator of the voltage regulator of FIG. 1;

FIG. 3 is a schematic circuit diagram of an operational transconductance amplifier of the voltage regulator of FIG. 1;

DETAILED DESCRIPTION

Figure 1:
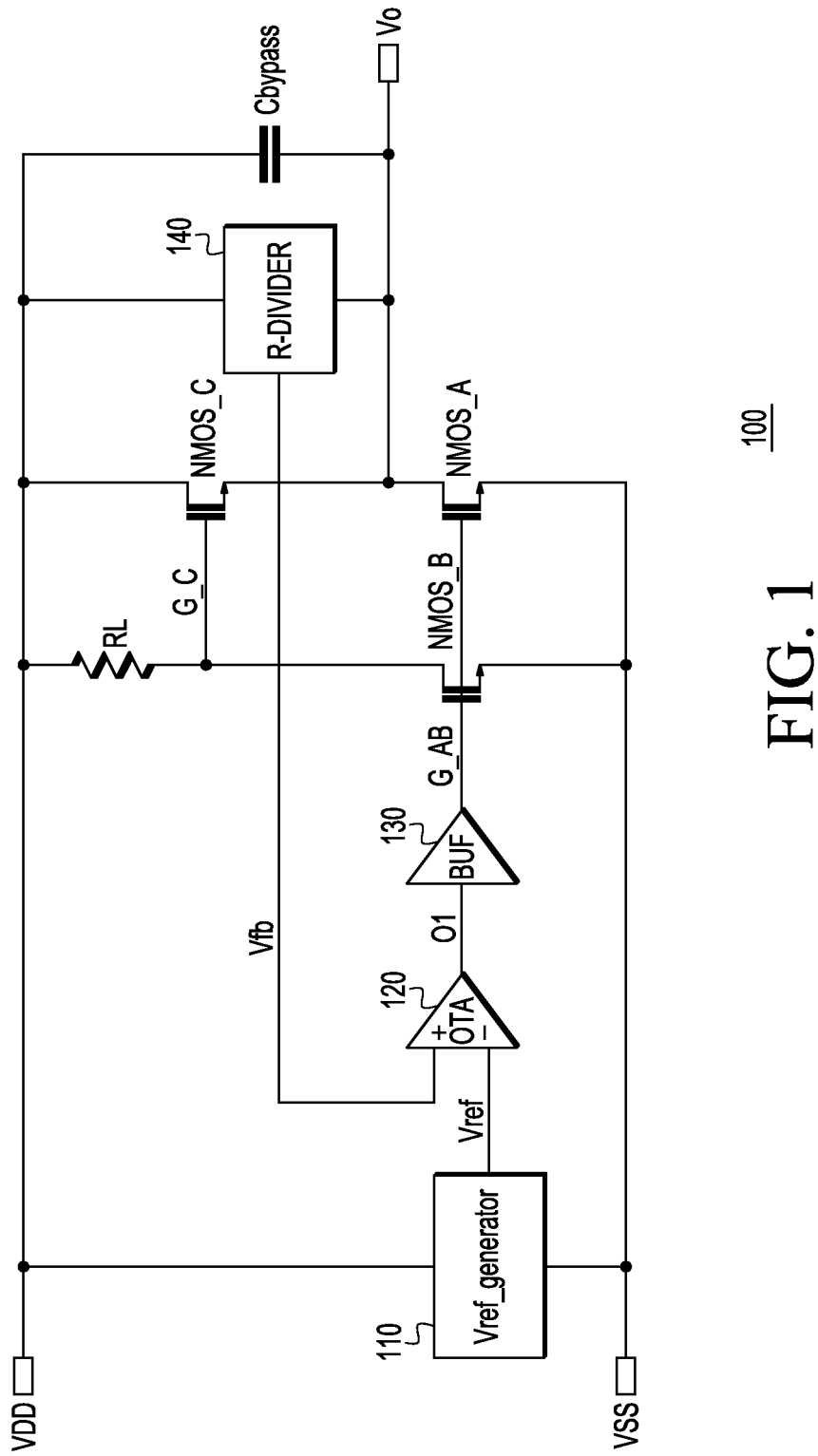
FIG. 1 is a schematic block diagram of a voltage regulator according to one embodiment of the invention.

Detailed illustrative embodiments of the present invention are disclosed herein. However, specific structural and functional details disclosed herein are merely representative for purposes of describing example embodiments of the present invention. The present invention may be embodied in many alternate forms and should not be construed as limited to only the embodiments set forth herein. Further, the terminology used herein is for the purpose of describing particular embodiments only and is not intended to be limiting of example embodiments of the invention.

As used herein, the singular forms "a," "an," and "the," are intended to include the plural forms as well, unless the context clearly indicates otherwise. It further will be understood that the terms "comprises," "comprising," "includes," and/or "including," specify the presence of stated features, steps, or components, but do not preclude the presence or addition of one or more other features, steps, or components. It also should be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

In one embodiment, the present invention is a voltage regulator that generates, at an output node, an output voltage that is a designed voltage level below a supply voltage for the voltage regulator. A reference voltage generator receives the supply voltage and a ground voltage and generates a reference voltage between the ground and supply voltages. A voltage divider is connected between the supply voltage and the output voltage to generate a feedback voltage between the supply and output voltages. An amplifier is connected to receive the reference voltage and the feedback voltage and generate an amplifier output voltage based on a difference between the reference and feedback voltages. A buffer is connected to receive the amplifier output voltage and generate a buffered voltage. A pass transistor is connected between the output and ground voltages and connected to receive the buffered voltage at its control node to sink an average load current appearing at the output node. A capacitor is connected between the supply and output voltages to provide a peak load current at the output node. A load-current-detecting transistor is connected between the supply and ground voltages and connected to receive the buffered voltage at its control node to sense the load current appearing at the output node. A compensation transistor is connected between the supply and output voltages to compensate for leakage current between the output and ground voltages resulting from a leakage-current path downstream of the output node. An internal load is connected in series with the load-current-detecting transistor between the supply and ground nodes to convert the sensed load current into a voltage control signal applied to the control node of the compensation transistor.

FIG. 1 is a schematic block diagram of a voltage regulator 100 according to one embodiment of the invention. The voltage regulator 100 receives a supply voltage VDD and a ground voltage VSS and generates a supply-referenced output voltage Vo that is a designed voltage level below the supply voltage VDD.

A reference voltage generator 110 generates a reference voltage Vref that is referenced to the supply voltage VDD. The reference voltage Vref is applied to the negative input terminal of an operational transconductance amplifier (OTA) 120, which receives a feedback voltage Vfb at its positive terminal. The feedback voltage Vfb is generated by a voltage divider 140 that sets the gain of the voltage regulator 100. The OTA 120 provides sufficient gain to regulate the output voltage Vo to be at the designed voltage level below the supply voltage VDD.

An n-type major pass element NMOS_A is used to sink the average load current of downstream circuitry (not shown) that is powered by VDD and Vo. A bypass capacitor Cbypass is used to provide the peak load current. An n-type load-current-detecting element NMOS_B is used to sense the load current. An internal load, in this embodiment a resistive load RL, is used to convert the sensed load current into a control voltage G_C for an n-type auxiliary pull-up element NMOS_C that is used to compensate for the potential leakage current from Vo (i.e., from the output node) to VSS (ground) to avoid failure if a large leakage current path exists in any of the downstream circuitry. A buffer 130 is used to isolate the gain stage of the OTA 120 from the gate of NMOS_A to improve the loop stability.

In operation, when the output voltage Vo rises, the voltage divider 140 causes the feedback voltage Vfb to rise, which causes the output voltage O1 of the OTA 120 to rise, which causes the output voltage G_AB of the buffer BUF to rise, which causes the currents flowing through NMOS_B and NMOS_A to rise, which causes the control voltage G_C to drop, which causes the current flowing through NMOS_C to drop, which causes the output voltage Vo to drop.

Similarly, when the output voltage Vo drops, the voltage divider 140 causes the feedback voltage Vfb to drop, which causes the output voltage O1 of the OTA 120 to drop, which causes the output voltage G_AB of the buffer BUF to drop, which causes the currents flowing through NMOS_B and NMOS_A to drop, which causes the control voltage G_C to rise, which causes the current flowing through NMOS_C to rise, which causes the output voltage Vo to rise.

In this way, the voltage regulator 100 regulates the output voltage Vo to track the supply voltage according to the following equation:

$$\text{VDD}-\text{Vo}=K*(\text{VDD}-\text{Vref}),$$

where K is the gain of the voltage regulator 100 determined by the voltage divider 140.

FIG. 2 is a schematic circuit diagram of the reference voltage generator 110 of FIG. 1. The reference voltage generator 110 (i) receives the supply voltage VDD, the ground voltage VSS, and a ground-referenced reference voltage Vbg, such as a band-gap reference voltage commonly available in integrated circuits that is insensitive to process, voltage, and temperature (PVT) variation, and (ii) generates the supply-referenced reference voltage Vref.

In operation, the amplifier AMP, which may be a conventional operational transconductance amplifier, regulates the control voltage Vgate for the n-type transistor MN0 to force the feedback voltage Vmir to be equal to the reference voltage Vbg such that the current flowing through the resistor R1 is Vbg/R1. This same current Vbg/R1 flows through the transistor MN0 and the resistor R2, which is connected between the nodes VDD and Vref. As such, the voltage difference between the supply voltage VDD and the supply-referenced voltage Vref is Vbg*R2/R1. In one possible implementation in which Vbg=1.2V, R1=12 kohm, and R2=30 kohm, the voltage drop across R2 is 3V. Thus, in this example, the supply-referenced reference voltage Vref will be 3V below the supply voltage VDD.

FIG. 3 is a schematic circuit diagram of the operational transconductance amplifier 120 of FIG. 1. The OTA 120 (i) receives the supply voltage VDD, the ground voltage VSS, the reference voltage Vref from the reference voltage generator 110 at the minus input node INM, and the feedback voltage Vfb from the voltage divider 140 at the plus input node INP, and (ii) generates the OTA output voltage O1 at the output node OUT.

In operation, when the feedback voltage Vfb becomes greater than the reference voltage Vref, then (i) the current flowing through the n-type transistor MN2 will increase and (ii) the current flowing through the n-type transistor MN1 will decrease. As a result, (i) the current flowing through MP3 will increase and (ii) the current flowing through MP1 will decrease. This, in turn, will cause (i) the mirrored current flowing through the p-type mirror transistor MP4 to increase and (ii) the mirrored current flowing through the p-type mirror transistor MP2 to decrease. This, in turn, will cause the current flowing through the n-type transistor MN3 to decrease, which will cause the mirrored current flowing through the n-type mirror transistor MN4 to decrease, which will cause the OTA output voltage O1 to rise.

Similarly, when the feedback voltage Vfb becomes smaller than the reference voltage Vref, then (i) the current flowing through the n-type transistor MN2 will decrease and (ii) the current flowing through the n-type transistor MN1 will increase. As a result, (i) the current flowing through MP3 will decrease and (ii) the current flowing through MP1 will increase. This, in turn, will cause (i) the mirrored current flowing through the p-type mirror transistor MP4 to decrease and (ii) the mirrored current flowing through the p-type mirror transistor MP2 to increase. This, in turn, will cause the current flowing through the n-type transistor MN3 to increase, which will cause the mirrored current flowing through the n-type mirror transistor MN4 to increase, which will cause the OTA output voltage O1 to fall.

Thus, when the feedback voltage Vfb becomes greater than the reference voltage Vref, the OTA output voltage O1 increases, and vice versa. Since the OTA 120 is configured in the voltage regulator 100 in a closed loop, the voltages Vfb and Vref at nodes INP and INM, respectively, will be driven to be the same, such that the current flowing through MP4 will match the current flowing through MN4.

Figure 4:
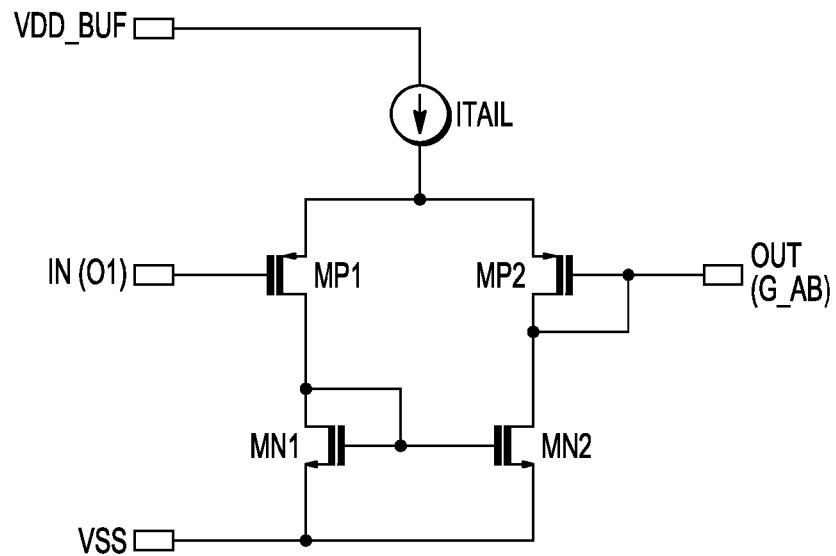
FIG. 4 is a schematic circuit diagram of a buffer of the voltage regulator of FIG. 1.

FIG. 4 is a schematic circuit diagram of the buffer 130 of FIG. 1. The buffer 130 (i) receives a buffer supply voltage VDD_BUF (which can be the supply voltage VDD or some other available power supply voltage), the ground voltage VSS, and the OTA output voltage O1 from the OTA 120 at the input node IN and (ii) generates the buffer output voltage G_AB at the output node OUT. In certain implementations, the buffer 130 is a conventional unity-gain buffer that presents the same voltage level O1 received at the input node IN as its output voltage G_AB at the output node OUT.

In operation, when the voltage O1 at the input node IN rises, the current flowing through the p-type transistor MP1 decreases, which causes the currents flowing through the n-type transistor MN1 and the n-type mirror transistor MN2 to decrease. Meanwhile, due to the constant current source ITAIL, the current through the p-type transistor MP2 increases, which causes the voltage G_AB at the output node OUT to rise. As result, the current flowing through MP2 will start to decrease until the current flowing through MP2 matches the current flowing through MN2. Thus, when the input voltage O1 rises, the output voltage G_AB also rises.

Similarly, when the voltage O1 at the input node IN drops, the current flowing through the p-type transistor MP1 increases, which causes the currents flowing through the n-type transistor MN1 and the n-type mirror transistor MN2 to increase. Meanwhile, due to the constant current source ITAIL, the current through the p-type transistor MP2 decreases, which causes the voltage G_AB at the output node OUT to drop. As result, the current flowing through MP2 will start to increase until the current flowing through MP2 matches the current flowing through MN2. Thus, when the input voltage O1 falls, the output voltage G_AB also falls.

Figure 5:
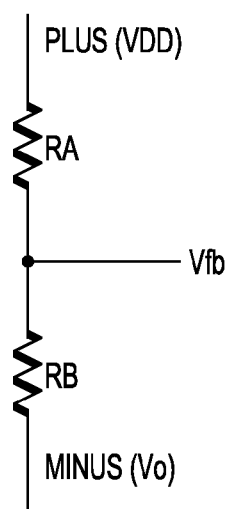
FIG. 5 is a schematic circuit diagram of a voltage divider of the voltage regulator of FIG. 1.

FIG. 5 is a schematic circuit diagram of the voltage divider 140 of FIG. 1. The voltage divider 140 (i) receives the supply voltage VDD and the output voltage Vo and (ii) generates the feedback voltage Vfb, whose voltage level is a function of the resistances of resistors RA and RB, where the gain K of the voltage regulator 100 is given by K=(RA+RB)/RA.

Although the invention has been described in the context of the voltage regulator 100 of FIGS. 1-5, those skilled in the art will understand that the invention is not necessarily limited to this particular implementation. For example, bipolar transistors could be used instead of MOS transistors. Also, FIGS. 2-5 show particular implementations for corresponding elements in FIG. 1. Those skilled in the art will understand that alternative implementations are possible for each of those elements.

In certain implementations, at least one of the reference voltage generator 110 and the voltage divider 140 is programmable such that the designed voltage level below the supply voltage VDD for the output voltage Vo is adjustable. For example, the reference voltage generator 110 can be made programmable by implementing the resistor R1 and/or the resistor R2 of FIG. 2 using programmable resistors. Similarly, the voltage divider 140 can be made programmable by implementing the resistor RA and/or the resistor RB of FIG. 5 using programmable resistors.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

Also, for purposes of this disclosure, it is understood that all gates are powered from a fixed-voltage power domain (or domains) and ground unless shown otherwise. Ground may be considered a power source having a voltage of approximately zero volts, and a power source having any desired voltage may be substituted for ground.

Signals and corresponding nodes, ports, or paths may be referred to by the same name and are interchangeable for purposes here.

Transistors are typically shown as single devices for illustrative purposes. However, it is understood by those with skill in the art that transistors will have various sizes (e.g., gate width and length) and characteristics (e.g., threshold voltage, gain, etc.) and may consist of multiple transistors coupled in parallel to get desired electrical characteristics from the combination. Further, the illustrated transistors may be composite transistors.

As used in this specification and claims, the term "channel node" refers generically to either the source or drain of a metal-oxide semiconductor (MOS) transistor device (also referred to as a MOSFET), the term "channel" refers to the path through the device between the source and the drain, and the term "control node" refers generically to the gate of the MOSFET. Similarly, as used in the claims, the terms "source," "drain," and "gate" should be understood to refer either to the source, drain, and gate of a MOSFET or to the emitter, collector, and base of a bi-polar device when an embodiment of the invention is implemented using bi-polar transistor technology.

Unless explicitly stated otherwise, each numerical value and range should be interpreted as being approximate as if the word "about" or "approximately" preceded the value or range.

It will be further understood that various changes in the details, materials, and arrangements of the parts which have been described and illustrated in order to explain embodiments of this invention may be made by those skilled in the art without departing from embodiments of the invention encompassed by the following claims.

In this specification including any claims, the term "each" may be used to refer to one or more specified characteristics of a plurality of previously recited elements or steps. When used with the open-ended term "comprising," the recitation of the term "each" does not exclude additional, unrecited elements or steps. Thus, it will be understood that an apparatus may have additional, unrecited elements and a method may have additional, unrecited steps, where the additional, unrecited elements or steps do not have the one or more specified characteristics.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

The embodiments covered by the claims in this application are limited to embodiments that (1) are enabled by this specification and (2) correspond to statutory subject matter. Non-enabled embodiments and embodiments that correspond to non-statutory subject matter are explicitly disclaimed even if they fall within the scope of the claims.

The invention claimed is:

1. A voltage regulator that generates, at an output node, an output voltage that is a designed voltage level below a supply voltage for the voltage regulator, the voltage regulator comprising:
    a reference voltage generator that receives the supply voltage and a ground voltage and generates a reference voltage between the ground and supply voltages;
    a voltage divider connected between the supply voltage and the output voltage to generate a feedback voltage between the supply voltage and the output voltage;
    an amplifier connected to receive the reference voltage and the feedback voltage and generate an amplifier output voltage based on a difference between the reference voltage and the feedback voltage;
    a buffer connected to receive the amplifier output voltage and generate a buffered voltage;
    a pass transistor connected between the output voltage and the ground voltage, and connected to receive the buffered voltage at its control node to sink an average load current appearing at the output node;
    a capacitor connected between the supply and output voltages to provide a peak load current at the output node;
    a load-current-detecting transistor connected between the supply and ground voltages and connected to receive the buffered voltage at its control node to sense the load current appearing at the output node;
    a compensation transistor connected between the supply and output voltages to compensate for leakage current between the output and ground voltages resulting from a leakage-current path downstream of the output node; and
    an internal load connected in series with the load-current-detecting transistor between the supply and ground voltages to convert the sensed load current into a voltage control signal applied to the control node of the compensation transistor.

2. The voltage regulator of claim 1, wherein:
    the gain of the voltage divider is based on a resistance ratio of the voltage divider; and
    the designed voltage level is based on the reference voltage and the gain of the voltage divider.

3. The voltage regulator of claim 2, wherein at least one of the reference voltage generator and the voltage divider is programmable such that the designed voltage level is adjustable.

4. The voltage regulator of claim 1, wherein the reference voltage generator generates the reference voltage based on a received bandgap reference voltage.

5. The voltage regulator of claim 4, wherein the reference voltage generator comprises:
    a second amplifier connected to receive the bandgap reference voltage and a second feedback voltage and generate a second amplifier output voltage based on a difference between the bandgap reference voltage and the second feedback voltage;
    a transistor connected to receive the second amplifier output voltage at its control node;
    a first resistor connected between the transistor and the ground voltage, wherein the second feedback voltage is the voltage level at the interconnection between the transistor and the first resistor; and a second resistor, connected between the supply voltage and the transistor, wherein the reference voltage is the voltage level at the interconnection between the second resistor and the transistor.

6. The voltage regulator of claim 1, wherein the amplifier is an operational transconductance amplifier (OTA).

7. The voltage regulator of claim 1, wherein the buffer is a unity-gain buffer.

8. The voltage regulator of claim 1, wherein the buffer isolates the amplifier from the pass transistor and the load-current-detecting transistor to improve loop stability within the voltage regulator.

9. The voltage regulator of claim 1, wherein:
the gain of the voltage divider is based on a resistance ratio of the voltage divider;
the designed voltage level is based on the reference voltage and the gain of the voltage divider;
the reference voltage generator generates the reference voltage based on a received bandgap reference voltage;
the reference voltage generator comprises:
   a second amplifier connected to receive the bandgap reference voltage and a second feedback voltage and generate a second amplifier output voltage based on a difference between the bandgap reference voltage and the second feedback voltage;
   a transistor connected to receive the second amplifier output voltage at its control node;
   a first resistor connected between the transistor and the ground voltage, wherein the second feedback voltage is the voltage level at the interconnection between the transistor and the first resistor; and
   a second resistor, connected between the supply voltage and the transistor, wherein the reference voltage is the voltage level at the interconnection between the second resistor and the transistor;
the amplifier is an operational transconductance amplifier (OTA); and
the buffer is a unity-gain buffer that isolates the amplifier from the pass transistor and the load-current-detecting transistor to improve loop stability within the voltage regulator.

10. The voltage regulator of claim 9, wherein at least one of the reference voltage generator and the voltage divider is programmable such that the designed voltage level is adjustable.

11. The voltage regulator of claim 1, wherein the internal load comprises a resistor connected between the supply voltage and a control node of the compensation transistor.

* * * * *